(12) United States Patent
Hahn et al.

(10) Patent No.: US 11,267,562 B2
(45) Date of Patent: Mar. 8, 2022

(54) METHOD FOR DETECTING DAMAGE TO A ROTOR OF AN AIRCRAFT

(71) Applicant: ZF Friedrichshafen AG, Friedrichshafen (DE)

(72) Inventors: Steffen Hahn, Munich (DE); Jan Haar, Ahnatal (DE); Uwe Arnold, Kassel (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 16 days.

(21) Appl. No.: 16/625,300

(22) PCT Filed: Jun. 22, 2018

(86) PCT No.: PCT/EP2018/066713
§ 371 (c)(1),
(2) Date: Dec. 20, 2019

(87) PCT Pub. No.: WO2018/234523
PCT Pub. Date: Dec. 27, 2018

(65) Prior Publication Data
US 2020/0247533 A1    Aug. 6, 2020

(30) Foreign Application Priority Data

Jun. 22, 2017  (DE) .......................... 102017210565.8

(51) Int. Cl.
*B64C 27/00* (2006.01)
*G01H 1/00* (2006.01)

(52) U.S. Cl.
CPC .......... *B64C 27/006* (2013.01); *B64C 27/001* (2013.01); *G01H 1/006* (2013.01); *B64C 2027/004* (2013.01)

(58) Field of Classification Search
CPC ... B64C 27/001; B64C 27/006; B64C 27/007; B64C 2027/002; B64C 2027/003; B64C 2027/004; G01H 1/006
See application file for complete search history.

(56) References Cited

U.S. PATENT DOCUMENTS 5,383,133 A * 1/1995 Staple ................... B64C 27/001
                                                       340/963
2014/0070153 A1    3/2014 Lin et al.

FOREIGN PATENT DOCUMENTS

DE    10 2009 001 393 A1    9/2010
DE    10 2012 206 755 A1    10/2013
(Continued)

OTHER PUBLICATIONS

International Search Report and Written Opinion of the International Search Authority dated Jul. 27, 2018 in International Application No. PCT/EP2018/066713 (English and German languages) (16 pp.).

(Continued)

*Primary Examiner* — Richard A Edgar
(74) *Attorney, Agent, or Firm* — Crowell & Moring LLP

(57) ABSTRACT

A method for detecting damages to a rotor of an aircraft, where the aircraft comprises actuators for active vibration reduction, may comprising one or more of the following steps: determining actuator variables in a reference flight of the aircraft; plotting the actuator variables of respective data range tiles determined in the reference flight of the aircraft in first coordinates of a coordinate system, wherein the coordinate system contains numerous data range tiles; obtaining the number of actuator variables in the reference flight of the aircraft that are located in each data range tile; eliminating the data range tiles that have a number of actuator variables lying below a limit value for this in the reference flight of the aircraft, by means of which a refer- (Continued)

ence flight signature is created; and determining actuator variables for a flight-specific signature.

13 Claims, 13 Drawing Sheets

(56) References Cited

FOREIGN PATENT DOCUMENTS

| | | |
|---|---|---|
| GB | 2 233 798 A | 1/1991 |
| WO | WO 2015/160945 A1 | 10/2015 |

OTHER PUBLICATIONS

Pawar et al., "Helicopter rotor health monitoring—a review", Proceedings of the Institution of Mechanical Engineers, Part G: Journal of Aerospace Engineering, vol. 221, Part G: J, May 1, 2007, XP055493186 (19 pp.).

David Pratt, "The Application of Advanced Anomaly Detection to Tail Rotor HUMS Data" Mar. 1, 2013, XP 055493429, Obtained from the Internet from: /https://publicapps.caa.co.uk/docs/33/PAPER%20201201%20HUMS%20DATA%20310113.pdf., obtained on Sep. 30, 2019 (140 pp. total) [pp. 1-70; note: submitted in two sections due to size constraints].

David Pratt, "The Application of Advanced Anomaly Detection to Tail Rotor HUMS Data" Mar. 1, 2013, XP 055493429, Obtained from the Internet from: /https://publicapps.caa.co.uk/docs/33/PAPER%20201201%20HUMS%20DATA%20310113.pdf., obtained on Sep. 30, 2019 (140 pp. total) [pp. 71-140; note: submitted in two sections due to size constraints].

\* cited by examiner

METHOD FOR DETECTING DAMAGE TO A ROTOR OF AN AIRCRAFT

RELATED APPLICATIONS

This application is a filing under 35 U.S.C. § 371 of International Patent Application PCT/EP2018/066713, filed Jun. 22, 2018, and claiming priority to German Patent Application 10 2017 210 565.8, filed Jun. 22, 2017. All applications listed in this paragraph are hereby incorporated by reference in their entireties.

TECHNICAL FIELD

The present disclosure relates to a method for detecting damage to a main and/or tail rotor of an aircraft, in particular a rotorcraft, e.g. a helicopter, where the aircraft has actuators for active vibration reduction of main and/or tail rotor vibrations.

BACKGROUND

It is known that the amplitudes and phases of rotor-harmonic vibrations in the cells of the aircraft change, depending on the flying state. It is also known that the amplitudes and phases of rotor-harmonic vibrations in the cells of the aircraft change depending on the configuration of the aircraft, e.g. the mass, the position of the center of gravity, etc. It is likewise known that damages to the main and/or tail rotor, resulting in a change in the rotor blade mass or a change in the aerodynamic properties of the rotors, alter the amplitudes and phases of rotor-harmonic vibrations in the cells of the aircraft. Current HUM systems (Health and Usage Monitoring Systems) are capable of detecting damages to the main and/or tail rotors by comparing predicted and measured vibrations. HUM systems are described by way of example in GB8915406 and US20140070153A1.

So-called active systems have been used for some time to be able to reduce oscillations and/or vibrations. An active or actively regulated system can comprise an adjustable push rod and/or an adjustable trim flap. Both systems change and/or a generate additional forces and/or torques to the rotor with the same amplitudes but opposing phases of the original forces and/or torques. The superimposing can result in a destructive interference, thus reducing or ideally eliminating vibrations in a rotor. In other words, the rotor blades are actuated such that the undesired vibration forces are eliminated as much as possible. Electric length-adjustable push rods are known from DE102009001393A1 and DE 102012206755A1.

If a helicopter has an active system for reducing oscillations and/or vibrations, in particular main and/or tail rotor vibrations, the previously described principle for detecting errors can no longer be used, because the active systems are able to mask the changes in vibrations caused by damage to the rotor.

When actively regulated systems for vibration reduction are used, the amplitudes of the rotor-harmonic vibrations are low in all flying states when the performance of the respective system is satisfactory. Moreover, the vibrations in an undamaged aircraft normally no longer have a characteristic phase due to their low amplitude, as would be the case in helicopters without actively regulated systems for reducing vibration.

A significant portion of the rotor-harmonic vibrations that are to be reduced using the actively regulated systems are the result of production tolerances in various components, in particular components of the dynamic system of the helicopter, and can also be affected by aircraft-specific equipment variations and/or fittings, e.g. external load winches. As such, all helicopters, even of the same type, have different reference patterns or flight signatures.

The reference pattern is also not absolutely constant for an individual aircraft, because it is also affected by other factors such as the loading state and environmental conditions, e.g. external temperature, humidity, flying elevation, etc. Other effects are the result of deviations in the scope of use, e.g. vibrations due to flying speed or the flying state in relation to prevailing conditions.

BRIEF DESCRIPTION OF THE DRAWINGS

Certain embodiments shall be explained in greater detail below based on the following drawings. Therein.

DETAILED DESCRIPTION

Figure 1:
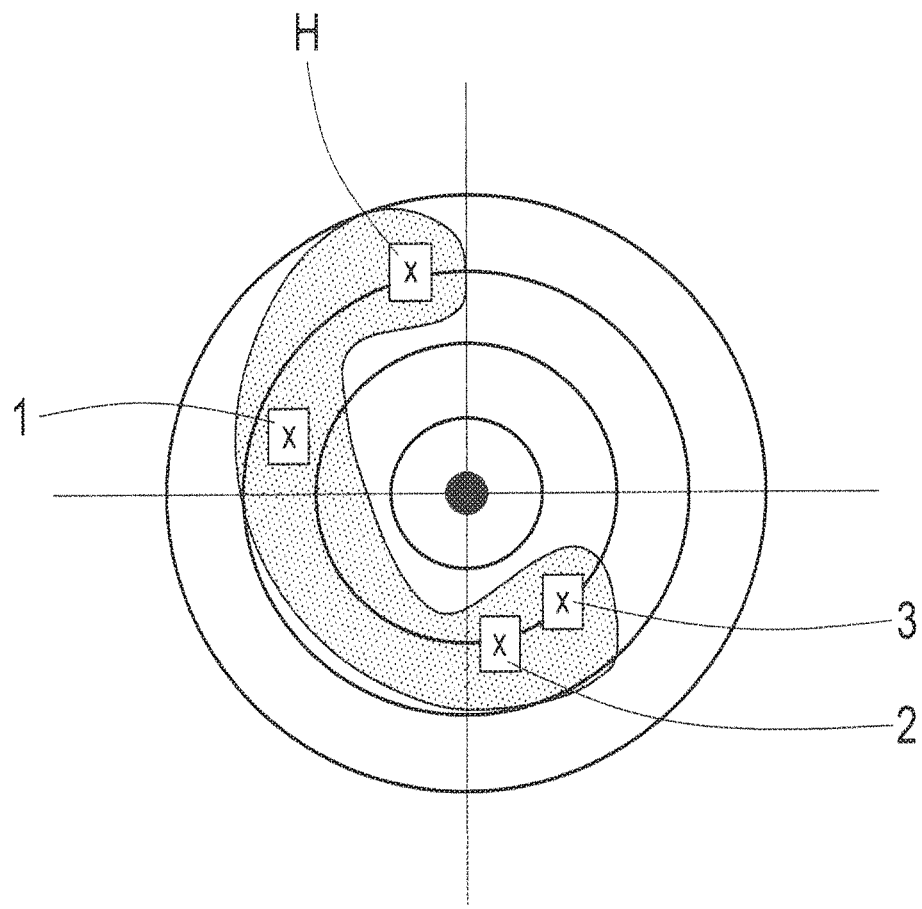
FIG. 1 shows an exemplary profile of the 1/rev. main rotor vibrations of an undamaged aircraft, without active vibration reduction, in various flying states.

An object of the invention is therefore to create a method for active vibration reduction for an aircraft with actuators, which detects vibrations caused, for example, by damage to the main and/or tail rotors of the aircraft.

In accordance with the method according to the invention for detecting damage to a rotor of an aircraft, in particular a helicopter, actuator variables are first determined in a reference flight of the aircraft, wherein the actuator variables determined in the reference flight of the aircraft are used for actively reducing vibrations.

The aircraft thus contains actuators for actively reducing vibrations. The actuators for vibration reduction form active or actively regulated systems that can be used to affect these vibrations with respect to their amplitudes and phases. The active systems can be composed of a number of subsystems, the effects of which are additively compounded.

Sensors can be used to determine actuator variables, which detect the actual setting or adjustment of the respective actuator, for example. In particular, an adjustment of the actuators from an initial state results in a reduction in vibrations, wherein substantially, a phase and amplitude of the vibrations has been changed. In other words, actuator variables comprise actuator adjustments from the initial states, wherein these are determined at numerous points in time during the reference flight.

By way of example, an adjustable trim flap is used as an actuator for active vibration reduction. Alternatively or additionally, an adjustable push rod is used as the actuator for active vibration reduction. A vibration reduction can then be initiated by adjusting the trim flap or the push rod. In particular, numerous trim flaps and/or push rods can be provided for vibration reduction.

By way of example, an angular rotation of a trim flap or a length adjustment of the push rod forms the actuator variable. It is also conceivable to draw on data in a control computer in this regard. The advantage with sensors is that data can be obtained independently of the control computer.

The term "actuator variable" refers to the respective settings or adjustments of the respective actuator. The reference flight of the aircraft is used for determining reference patterns or the reference flight signature that is used as the reference value for a respective, undamaged aircraft.

The reference flight signature is preferably obtained from a minimum number of reference flights by the respective aircraft, in order to keep the effects of environmental factors and other factors, e.g. deviations in the scope of use, to a minimum. This also involves the determination of actuator variables, in particular in the framework of numerous test flights. A sufficient number of actuator variables is preferably obtained after numerous test flights.

The actuator variables determined in the reference flight of the aircraft form a first measurement, which is converted to first vectors, wherein the first vectors represent the resulting direction and amplitude of the vibration-reducing effect of the actuators. In other words, adjustment vectors that serve as reference compilation variables at numerous points in time in the reference flight are determined from the sum of the detected actuator variables of the actuators being used for active vibration reduction.

In another step according to the invention, the actuator variables determined in the reference flight of the aircraft are plotted in first coordinates of a coordinate system, wherein the coordinate system contains numerous data range tiles, wherein the coordinates are assigned to respective data range tiles, wherein numerous coordinates can be plotted inside a data range tile.

In particular, the number of data range tiles, or the first data ranges, represent a space in which the first vectors can be plotted. The number of all of the first data ranges must therefore be sufficiently large, such that each first vector can be plotted in a corresponding first data range, wherein the amplitude of the first vectors is decisive.

A coordinate system is a system for a unique indication of the positions of data points in a data room, in particular a geometric space, presently the respective actuator variables or settings of the respective actuator that are used for active vibration reduction. In other words, the adjustment of the respective actuator from the initial state to an oscillation damping state is detected, and first stored in the coordinate system. The coordinates of the actuator variables thus indicate the precise setting of the respective actuator. A data room is a structure or list of data points in the present case, e.g. in the form of a table.

Data range tiles are understood to be closed and non-overlapping data ranges in the coordinate system. The data range tiles are formed by defining numerous empirically or theoretically determined amplitude and phase thresholds. The data range tiles thus represent interval ranges that can comprise numerous coordinates. By way of example, all of the coordinates from one data point (0|0) to another data point (1|1) are contained in a data range tile.

In another step according to the invention, the number of actuator variables in each data range tile are obtained in a reference flight of the aircraft. The number of actuator variables in each data range tile are also counted.

In particular, the first data ranges are evaluated based on the respective number of first vectors. There can be data ranges with a high or low number of first vectors. The first data ranges can also contain no first vectors. The evaluation can take the form of points, also referred to as scoring.

If a scoring is high, for example, i.e. there are numerous first vectors in a first data range, this means that certain settings of the actuators can be reproduced in a certain flying state in order to reduce the vibrations of the rotor, such that certain settings of the actuators can be regarded as characteristic.

In another step according to the invention, data range tiles that have a number of actuator variables in the reference flight of the aircraft that is less than a limit value for this are eliminated, by means of which a reference signature is obtained. The remaining data range tiles containing enough actuator variables thus form the reference flight signature.

In particular, the reference flight signature, or the reference pattern, is composed of the number of first data ranges that have first vectors, the value for which is higher than the limit value or threshold value, in order to minimize measurement errors and sporadic deviations from the reference pattern. In other words, if certain first data ranges remain below a certain scoring, these data ranges are not taken into account when generating the first pattern.

For a further processing of the data ranges, it is only necessary to distinguish between the first data ranges that have values and the first data ranges that do not have values, and the value of the scoring is no longer important. It is also conceivable, however, to take the actual evaluation into account.

In another step according to the invention, actuator variables are determined for a flight-specific signature, wherein the determined actuator variables are used for vibration reduction when the aircraft is in flight. In addition, reference flight data are not only collected during a reference flight or test flight, but also in a later flight, which represents, for example, a normal flight or implementation. The actuator variables that are then obtained are specific to the respective flight, and are affected in particular by rotor damages, e.g. tears or extension of existing tears.

In particular, the actuator variables for the flight-specific signature form second measurement values, which are converted to second vectors, as described above with regard to the first vectors. In other words, adjustment vectors in the form of reference compounded variables are provided at numerous times during flight from the sum of the obtained actuator variables for the actuators used for active vibration reduction.

In another step according to the invention, the actuator variables determined during flight of the aircraft are plotted in second coordinates of a coordinate system, wherein the coordinate system contains numerous data range tiles, wherein the coordinates are also assigned to respective data range tiles, wherein numerous coordinates can be plotted in a data range tile, and wherein the data range tiles of the flight-specific signature are identical to the data range tiles of the reference flight signature.

In addition, the actuator variables then determined during flight of the aircraft, specifically the second coordinates, as well as the actuator variables determined in the reference flight of the aircraft, specifically the first coordinates, are plotted in an identical coordinate system with identical data range tiles. As a result, the respective actuator variables can later be compared.

In particular, the data range tiles for the flight-specific signature form second data ranges containing the second vectors.

In another step according to the invention, the number of actuator variables in each data range tile are obtained during flight of the aircraft. In particular, those second data ranges that contain second vectors are obtained. This takes place in a manner identical to that in the reference flight, as described above.

In another step according to the invention, data range tiles are eliminated that have fewer actuator variables in the flight of the aircraft than a limit value provided for this, by means of which a flight-specific signature is obtained. Reference is also made here to the identical approach described above in reference to the reference flight. The only difference is that the actuator variables in the data range tiles were determined during flight of the aircraft, and not during a reference flight. For this reason, the remaining data range tiles form the flight-specific signature that is characteristic of the present flight.

In another step according to the invention, the respective data range tiles for the flight-specific signature and the reference signature are compared with one another, wherein, when a limit value for the number of data range tiles deviating between the flight-specific signature and the reference signature is exceeded, a warning signal is issued for damage detection.

The comparison of the flight-specific signature and the reference signature can a difference in the respective data range tiles. As a result, identical data range tiles are removed, such that only different or deviating data range tiles remain.

If the number of deviating data range tiles exceeds a limit value or threshold value, it can be concluded that the rotor is damaged, and a warning signal is issued. The warning signal can be visual and/or acoustic. It is also conceivable that the warning signal is also or alternatively issued in the form of a comment in a list, wherein the comment can be retrieved by a diagnosis system.

A difference between the flight-specific signature and the reference flight signature is preferably formed in order to obtain a difference signature, wherein the difference signature is compared with numerous damage signatures stored in a data base in order to identify a specific damage. The damage signatures stored in the data base are characteristic for specific damages. The damage signatures stored in the data base are preferably determined in actual tests and/or computer simulations. In particular, mathematical models are used to determine the damage to the rotor.

It has been shown that damages that occur in aircraft, in particular in helicopters with technological equipment or actuators for reducing vibrations, can be detected using the method according to the invention, independently of the mission profile.

The respective actuator variables are preferably depicted in polar coordinates of a polar coordinate system. Furthermore, both the actuator variables obtained in the reference flight and the actuator variables obtained in later flights are depicted in polar coordinates of a polar coordinate system.

A polar coordinate system in the present case is a two dimensional coordinate system in which each point is determined in a two dimensional space by the distance from a predefined fixed point, specifically the pole, and the angle to a fixed direction. The beam extending from the pole in the fixed direction is referred to as the polar axis. Furthermore, a distance from the pole is understood to be a radial coordinate, wherein an angle to the polar axis represents an angular coordinate.

Preferably, before depicting the reference flight signature, data range tiles for all angular coordinates from a pole of the polar coordinate system to a threshold radial coordinate are also supplied. As a result, the overall resulting settings of the actuators that have lower amplitudes are taken into account that normally have a lower effect with regard to the vibrations that are to be minimized, and also normally exhibit more regulating errors than settings of the actuators that have greater amplitudes.

At least the flight-specific signature is preferably compared with the reference flight signature when the aircraft is in flight. It is also preferred that at least the comparison of the flight-specific signature with the reference flight signature is carried out after a flight of the aircraft.

At least the comparison of the flight-specific signature with the reference flight signature also takes place in the framework of a "post flight" evaluation, i.e. offline, or after a flight, or an "in flight" evaluation, i.e. online, or during the flight. The "post flight" evaluation can issue a warning notification, e.g. by means of a display element, if a difference signature exceeds its limit value, for example. This warning notification indicates to the operator that there is damage to the main and/or tail rotor, which needs to be checked. With the "in flight" evaluation, an evaluation algorithm continuously checks the difference between the reference flight signature and the flight-specific signature, thus the current settings of the actuators for reducing vibrations. If a limit value for this is exceeded, the exceeding of this limit value can be displayed directly to the pilot. As a result, the pilot can avoid demanding flight maneuvers during the flight, for example.

The invention contains the technical teachings that first a minimum number of actuator variables are obtained during flight of the aircraft, before the comparison of the flight-specific signature with the reference flight signature. In other words, the flight of the aircraft must be long enough that a reliable conclusion can be reached with regard to the flight-specific signature, and thus a significant comparison can take place between the flight-specific signature and the reference flight signature. If the flight of the aircraft is too short, the significance of other factors is normally too great, such that false interpretations can be made that should be avoided.

According to a preferred embodiment of the invention, if the limit value for a gradient for the number of data range tiles deviating between the flight-specific signature and the reference flight signature is exceeded, a warning signal is issued. In other words, a change in the number of deviating data range tiles between the flight-specific signature and the reference flight signature is monitored, wherein if the change relating to the value of the gradient is too quick, and the limit value for this is exceeded, a warning signal is triggered.

The invention also relates to a computer program product containing machine readable instructions that, when they are carried out on a computer, provide the computer with a calculating logic, and cause it to execute the method according to the invention.

The method described above can also be used with helicopters that have no means for reducing vibrations. In differing from the method described above, instead of determining respective actuator variables, or vectors, vibration data are obtained with appropriate sensors. Damages to aircraft, in particular helicopters without technological equipment for reducing vibrations, can be detected with this aspect of the invention, independently of the mission profile.

FIG. 1 shows a characteristic vibration profile of the 1/rev main rotor vibrations of an undamaged, thus intact, rotorcraft in the form of a conventional helicopter with a main rotor and a tail rotor, plotted in a polar coordinate system, which does not have a system for active vibration reduction. The points 1, 2, 3 and H represent reference measurements of the vibrations in various flying states. As such, point H represents a reference measurement, for example, of the vibrations while hovering, point 1 represents a reference measurement of the vibrations during forward flight at a first speed of 90 knots, for example, point 2 represents a reference measurement of the vibrations during another forward flight at a second speed, e.g., 110 knots, and point 3 represents a reference measurement of the vibrations during another forward flight at a third speed, e.g. 130 knots. The shaded region represents a corridor depicting a "normal" operating range of the undamaged aircraft while hovering and during forward flight, but not in "extreme" flying maneuvers.

Figure 2:
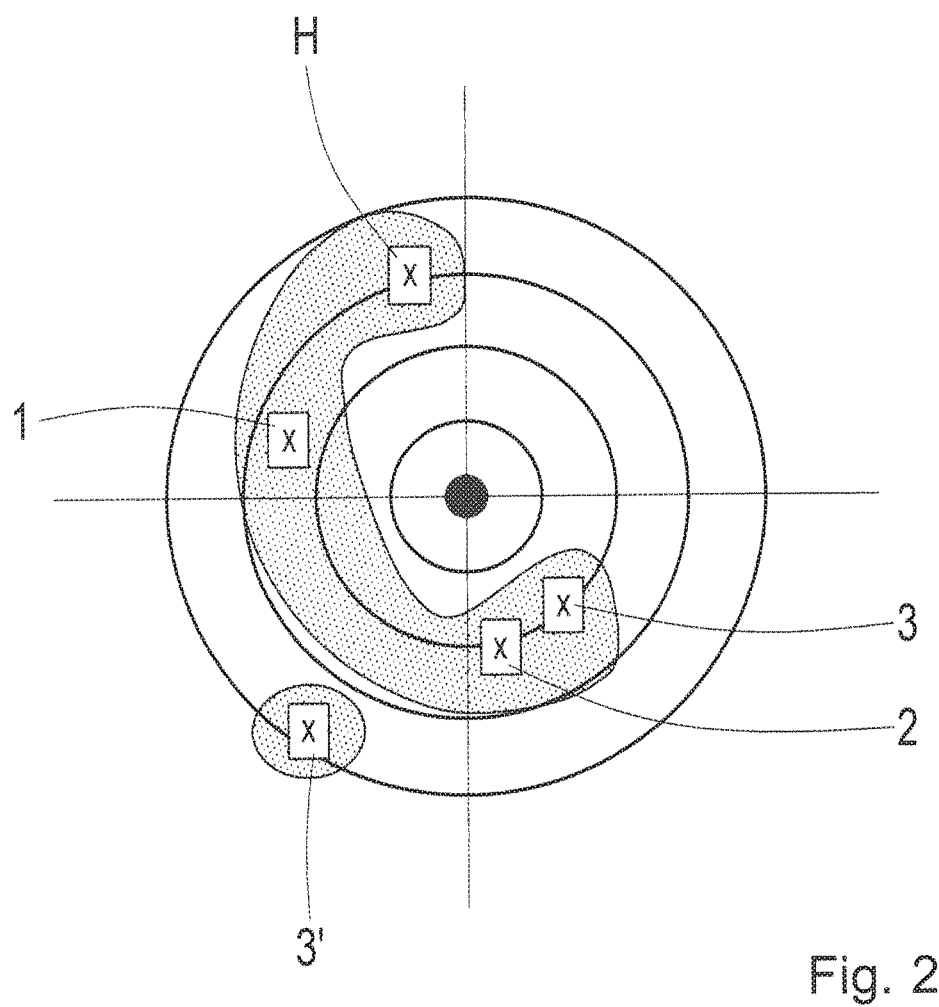
FIG. 2 shows an exemplary profile of the 1/rev main rotor vibrations of a damaged main rotor according to FIG. 1.

FIG. 2 shows the resulting vibrations 3' of a damaged main rotor in level flight at 130 knots for an aircraft without systems for active vibration reduction in comparison with the characteristic vibration profile from FIG. 1, by way of example. These errors can be detected with Health and Usage Monitoring Systems (HUMS) known from the prior art.

Figure 3:
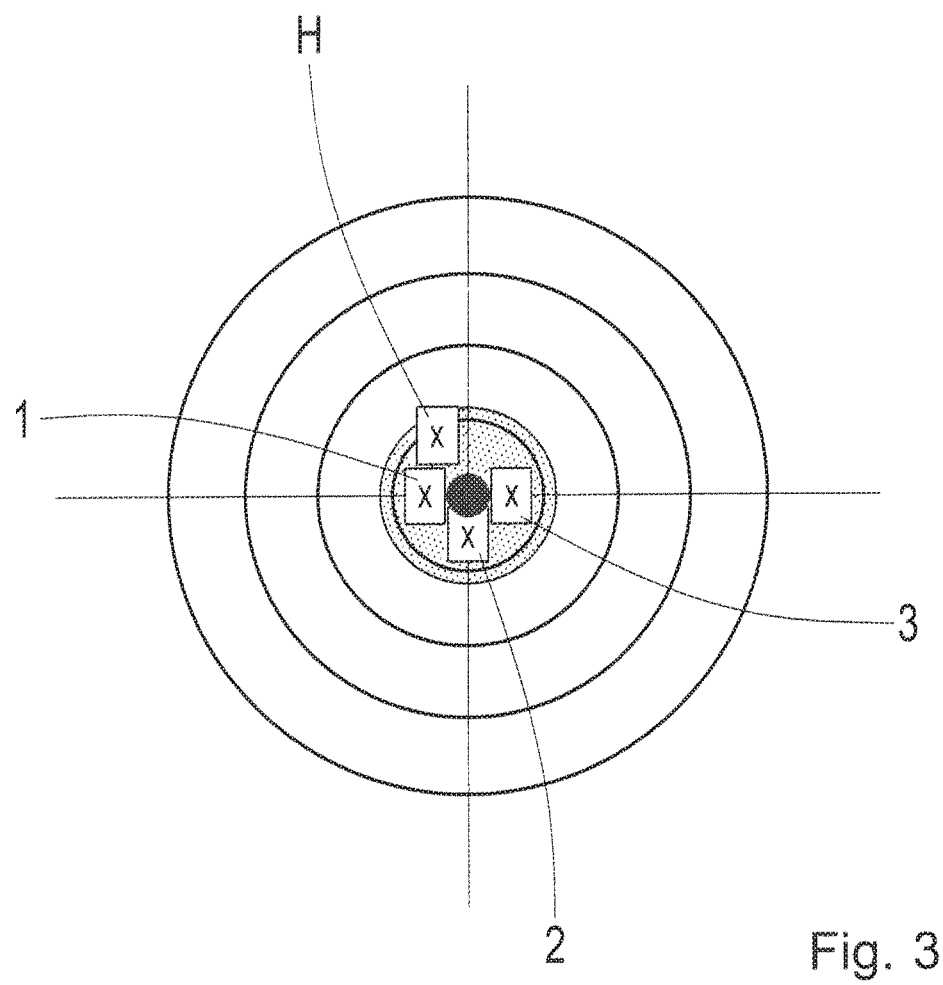
FIG. 3 shows an exemplary profile of the 1/ref main rotor vibrations of an undamaged aircraft with an active vibration reduction in various flying states.

FIG. 3 shows a vibration profile of a helicopter for the flying states shown in FIG. 1, wherein the helicopter therein has active systems for vibration reduction, in particular actuators for active vibration reduction. When using actuators for active vibration reduction, thus active systems for vibration reduction, the amplitudes of the rotor-harmonic vibrations are normally low in all flying states. Moreover, the vibrations of the undamaged aircraft no longer exhibit a characteristic phase, as is the case with helicopters without active systems for vibration reduction. Active systems for vibration reduction are likewise able to reduce vibrations the vibrations in a damaged main and/or tail rotor, such that it is not possible to determine a difference between undamaged and damaged helicopters with regard to vibrations. Points 1, 2, 3 and H represent reference measurements of the vibrations in various flying states.

A preferred exemplary embodiment of the method according to the invention for detecting damages to a rotor of an aircraft with actuators for active vibration reduction is explained below in reference to FIGS. 4 to 13. The method according to the invention shall be described based on a graphic evaluation method. This serves primarily as an illustration. In a practical application of the method according to the invention, the evaluation is made using a computer. Polar coordinate systems are shown in the following FIGS. 4 to 13, wherein the labeling and scale of the polar coordinate axes are identical, such that only the content varies, at least in part, i.e. the data points plotted therein. The distance from the pole, or origin (the center in the present case) is denoted by radial coordinates (0 to 10), wherein the angle to the polar axis is denoted by an angular coordinate (0 to 360).

A reference flight of the aircraft is first carried out, wherein actuator variables are determined in the reference flight of the aircraft. The determined actuator variables serve as variables for actuators and are used in the reference flight of the aircraft for active vibration reduction by means of the actuators.

Figure 4:
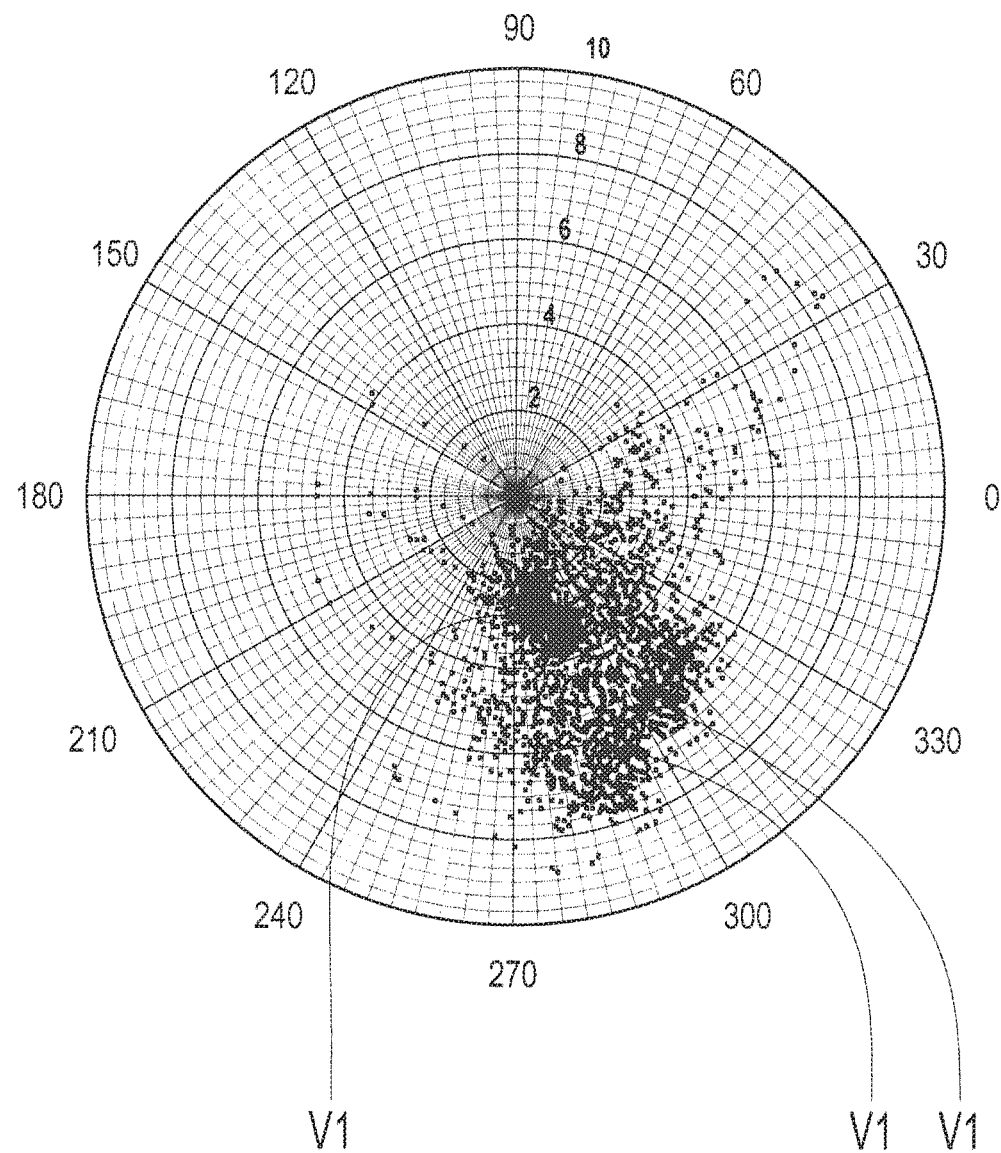
FIG. 4 shows an exemplary illustration of actuator variables determined in a reference flight of the aircraft, which are plotted in a polar coordinate system.

According to FIG. 4, the actuator variables, or first data points V1, determined in the reference flight of the aircraft are plotted in coordinates of a coordinate system, which are polar coordinates of a polar coordinate system in the present case. The actuator variables determined in the reference flight of the aircraft form first data points V1, wherein the first data points V1 represent the resulting direction and amplitude of the vibration reducing effects of the actuators.

The coordinate system has numerous data range tiles, or first data ranges D1, in particular a network of data range tiles, wherein numerous data points can be plotted in a respective data range tile. There are data range tiles in the present case that have no actuator variables. There are also data range tiles that have one or more actuator variables. Each data point V1 in the polar coordinate system thus represents a respective actuator variable that has been recorded in the reference flight of the aircraft. The number of actuator variables in the reference flight of the aircraft that are located in each data range tile are recorded in the further course of the method. The data points V1 in each data range tile D1 are also counted.

Figure 5:
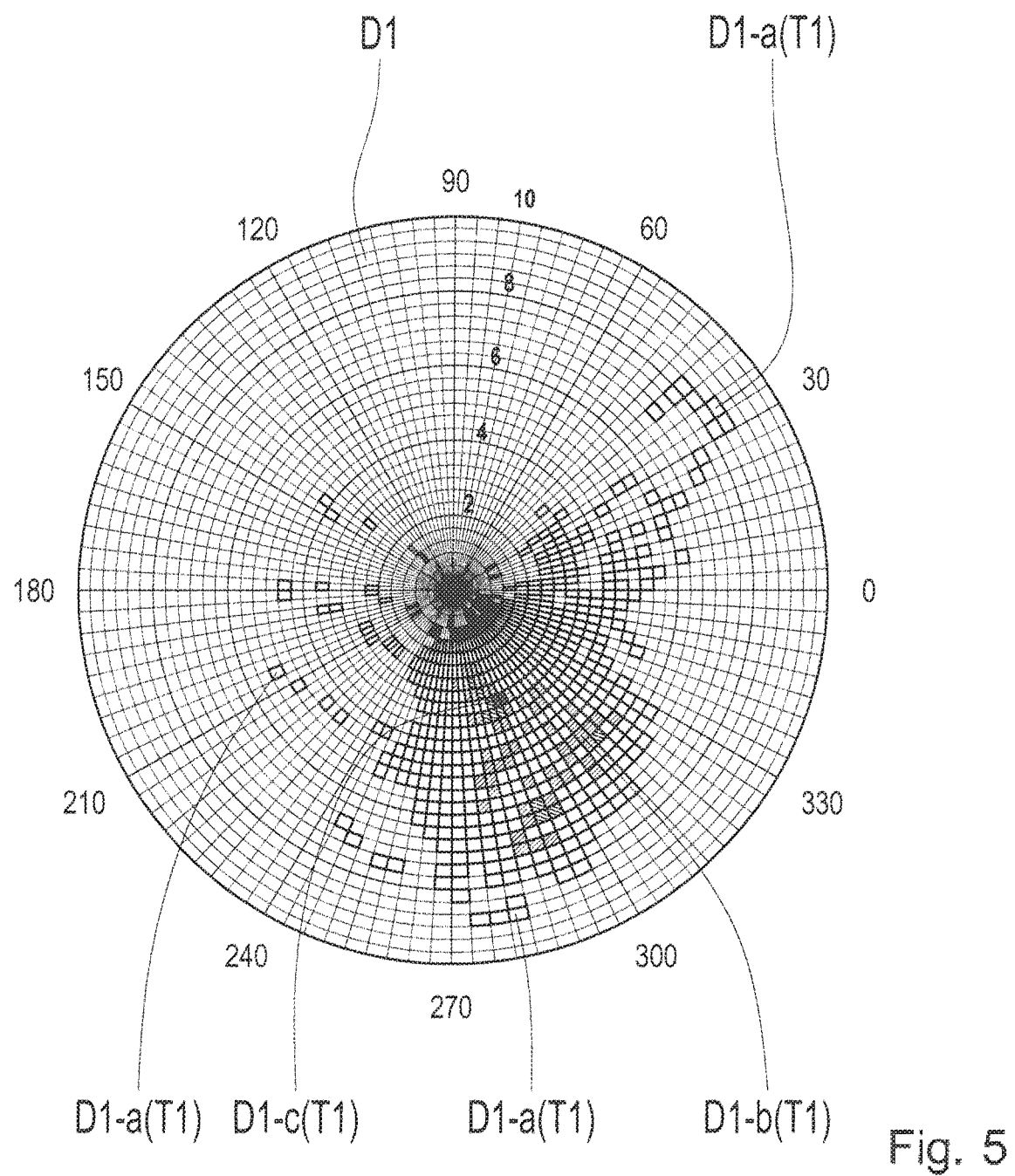
FIG. 5 shows an evaluation of data range tiles of the polar coordinate system according to FIG. 4 based on the respective number of actuator variables determined in a reference flight of the aircraft.

FIG. 5 shows another polar coordinate system based on the polar coordinate system in FIG. 4. In the present case, the data range tiles, or the first data range D1 is highlighted based on the number of actuator variables recorded in the reference flight of the aircraft. Data range tiles containing at least one actuator variable, or first data point V1 have a thicker frame, e.g. tile D1-$a$(T1). The parenthetical portion (T1) indicates the assignment of the data range tile to the reference flight signature. Cross-hatched data range tiles, e.g. tile D1-$b$(T1) contain more data points than the data range tiles D1-$a$(T1). The filled in tiles, e.g. D1-$c$(T1) contain more data points than the data range tiles D1-$b$(T1). For purposes of clarity, not all tiles D1, D1-$a$(T1), D1-$b$(T1), D1-$c$(T1) are provided with reference symbols.

Based on the polar coordinate system shown in FIG. 5, data range tiles D1-$d$(T1) that have a number of actuator variables in the reference flight of the aircraft lying below a limit value for this are filled in FIG. 6. In order to exclude measurement errors and statistically insignificant deviations from the reference flight signature, those data range tiles D1-$d$(T1) that have a number of data points lying below the limit value for this, and are thus filled in the present case, are not taken into account.

Figure 6:
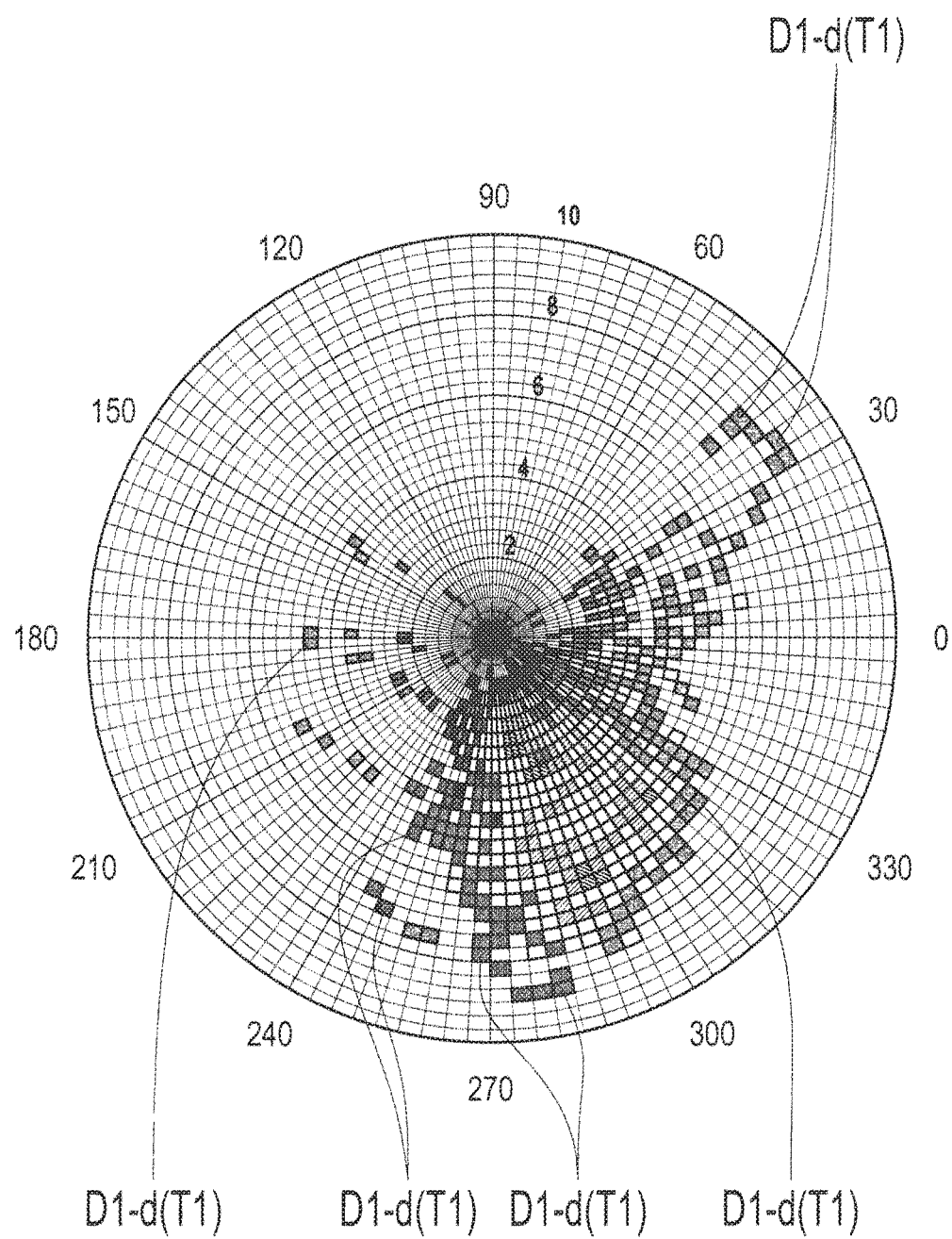
FIG. 6 shows a highlighting of the data range tiles according to FIG. 5, the number of actuator variables of which lies below a limit value in a reference flight of the aircraft.
Figure 7:
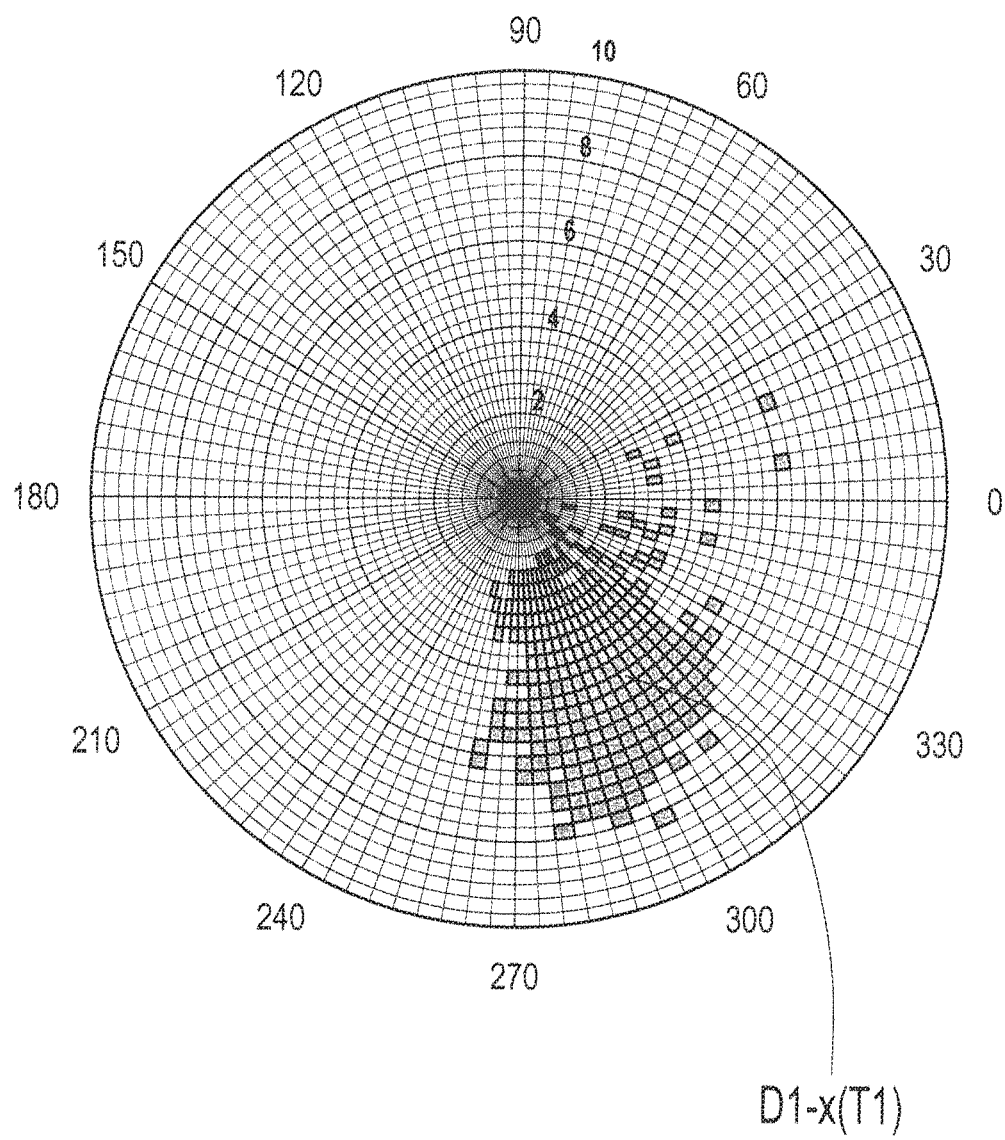
FIG. 7 shows an illustration of data range tiles according to FIG. 6 that lie above the limit value for this.

The data range tiles filled in FIG. 6 that have a number of actuator variables in the reference flight of the aircraft, or first data points V1, that is lower than the limit value for this, are no longer shown in FIG. 7, because they have been eliminated. Furthermore, only those data range tiles D1-$x$(T1) are still shown that have a number of actuator variables in the reference flight of the aircraft, or first data points V1, that is higher than the limit value for this.

Figure 8:
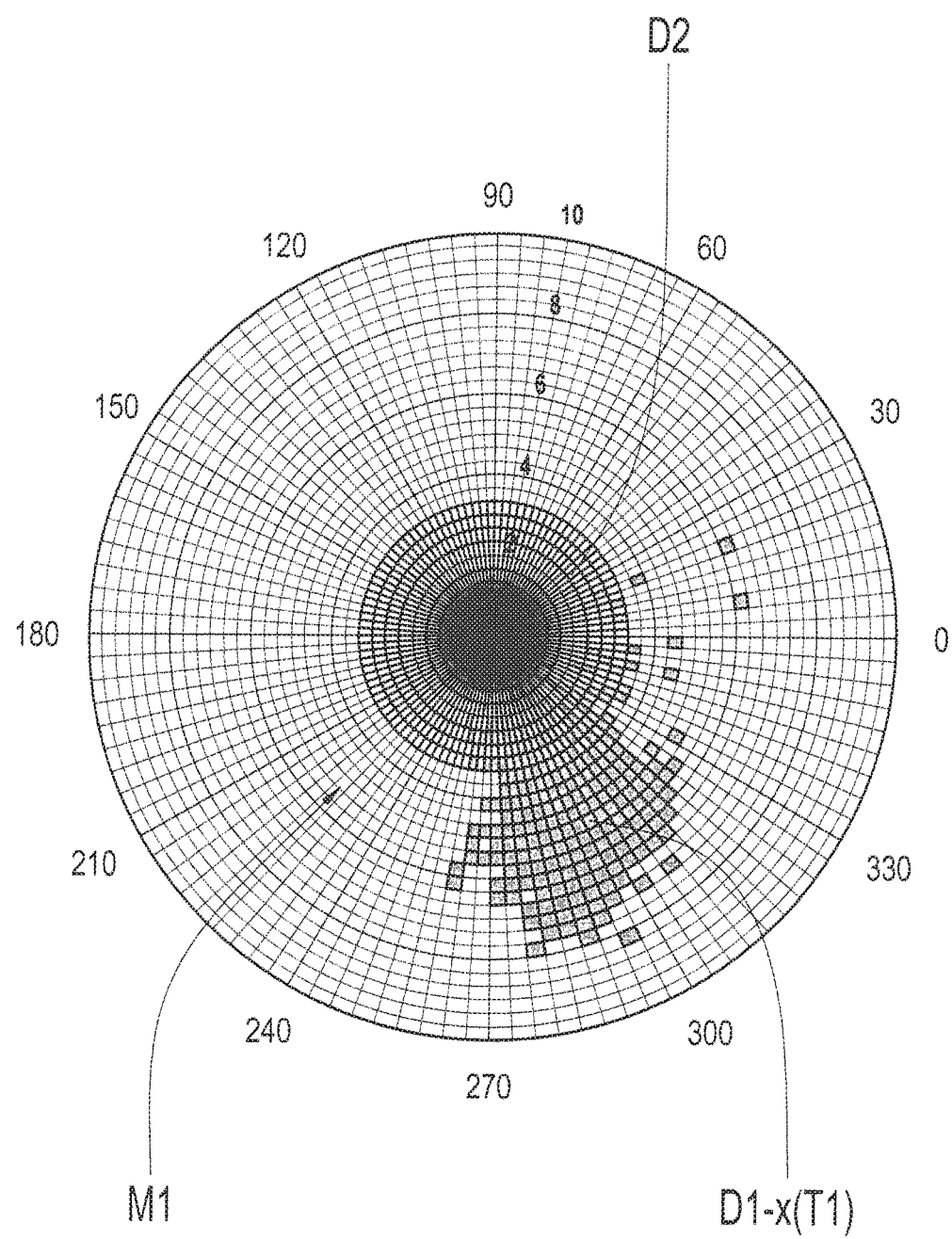
FIG. 8 shows an illustration of data range tiles according to FIG. 6, which lie above the limit value for this.

In FIG. 8, additional data range tiles, or second data ranges D2 are augmented for all angular coordinates from a pole of the polar coordinate system to a limit value radial coordinate, by means of which a reference flight signature is created. The polar coordinate system according to FIG. 8 also shows the reference flight signature M1 of the aircraft formed by the first data points V1, or actuator variables, in the reference flight of the aircraft and the second data ranges D2.

The following method steps take place during a flight of the aircraft subsequent to the reference flight.

Figure 9:
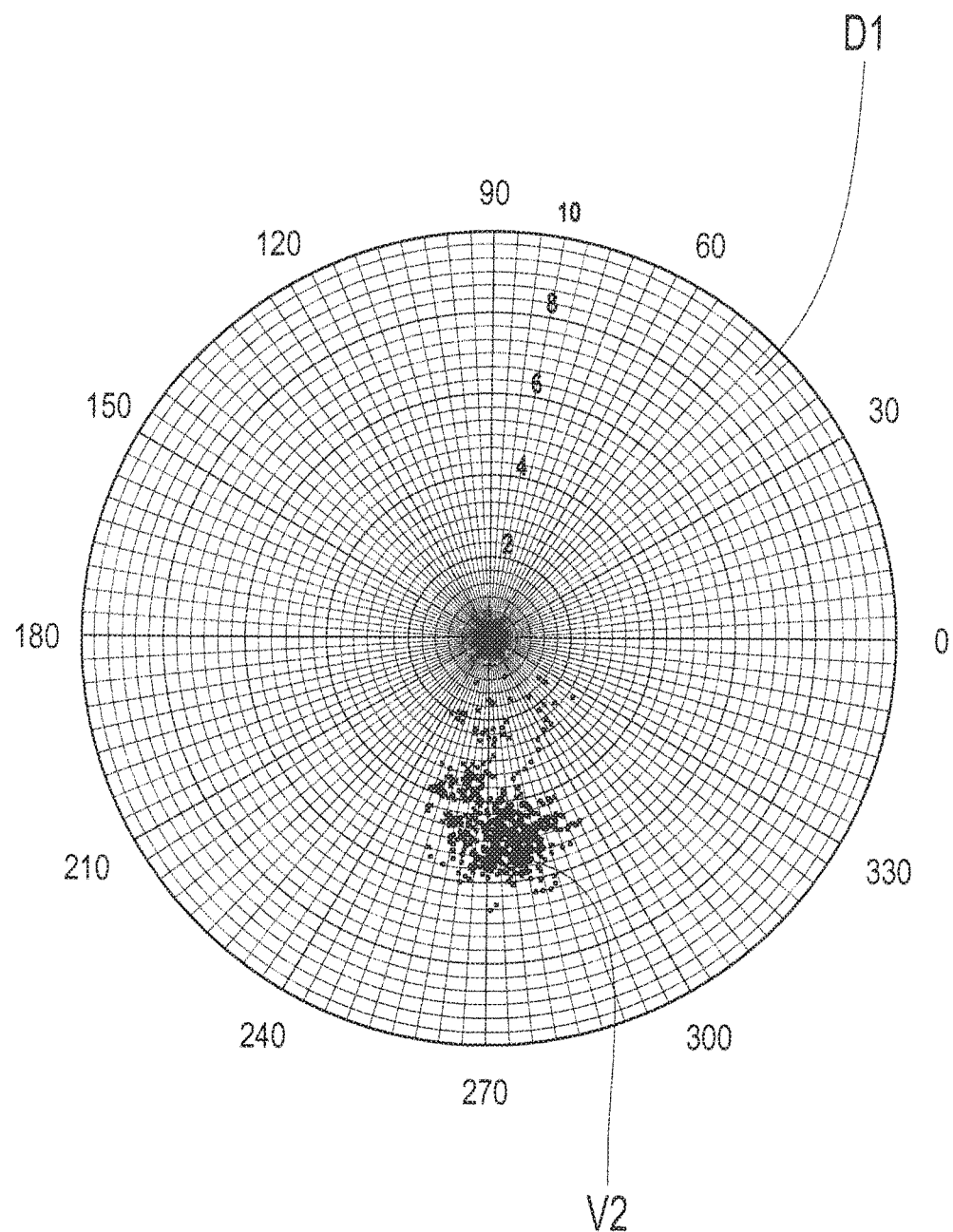
FIG. 9 shows an exemplary illustration of actuator variables determined in a flight of the aircraft, which are plotted on a polar coordinate system.

In FIG. 9, the actuator variables, or second data points V2, determined for a flight-specific signature are plotted in polar coordinates of a polar coordinate system. The determined actuator variables serve as variables of the actuators and are used in the flight of the aircraft for active vibration reduction by means of the actuators. The polar coordinate system shown in FIG. 9 is identical to the polar coordinate system shown in FIG. 4. In other words, the labeling and calculations of the coordinate axes, as well as the network of data range tiles D1 is identical, or are equal. The identity of the polar coordinate system and thus also the identity of the data range tiles D1 are necessary for a later comparison.

In the present case there are data range tiles that have no actuator variables. There are also data range tiles that have one or more actuator variables. Every second data point V2 in the polar coordinate system thus represents a respective actuator variable obtained during flight of the aircraft. The number of actuator variables in the flight of the aircraft located in each data range tile in the polar coordinate system shown in FIG. 9 is obtained in the subsequent course of the method. The data points in each data range tile are also counted. The network of data range tiles in the flight-specific signature is identical to the data range tiles of the reference signature.

Figure 10:
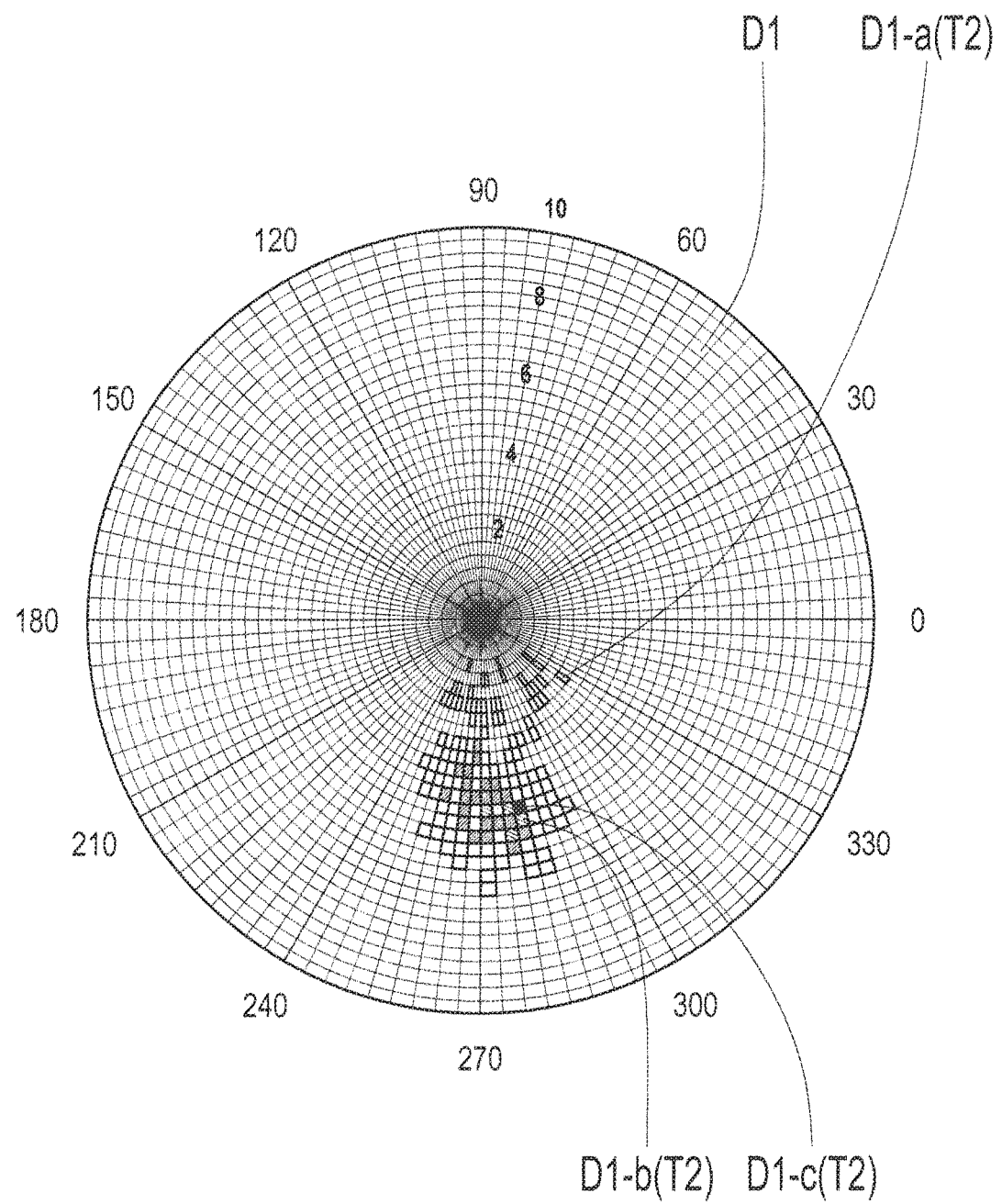
FIG. 10 shows an evaluation of the data range tiles in the polar coordinate system according to FIG. 9 based on the respective number of actuator variables determined during flight of the aircraft.

FIG. 10 shows another polar coordinate system based on the polar coordinate system shown in FIG. 9. In the present case, the data range tiles D1 are highlighted, based on the number of actuator variables obtained in the flight of the aircraft. Data range tiles D1 that contain at least one actuator variable, or a second data point V2, have a thicker frame, as is the case with tile D1-a(T2), for example. The parenthetical portion (T2) indicates the assignment of the data range tiles to a flight-specific signature. Cross-hatched data range tiles, e.g. tile D1-b(T2), contain more data points than the data range tiles D1-a(T2). Filled in tiles, e.g. D1-c(T2), contain more data points than the data range tiles D1-b(T2). For purposes of clarity, not all of the tiles D1, D1-a(T2), D1-b(T2), D1-c(T2) are provided with reference symbols.

Figure 11:
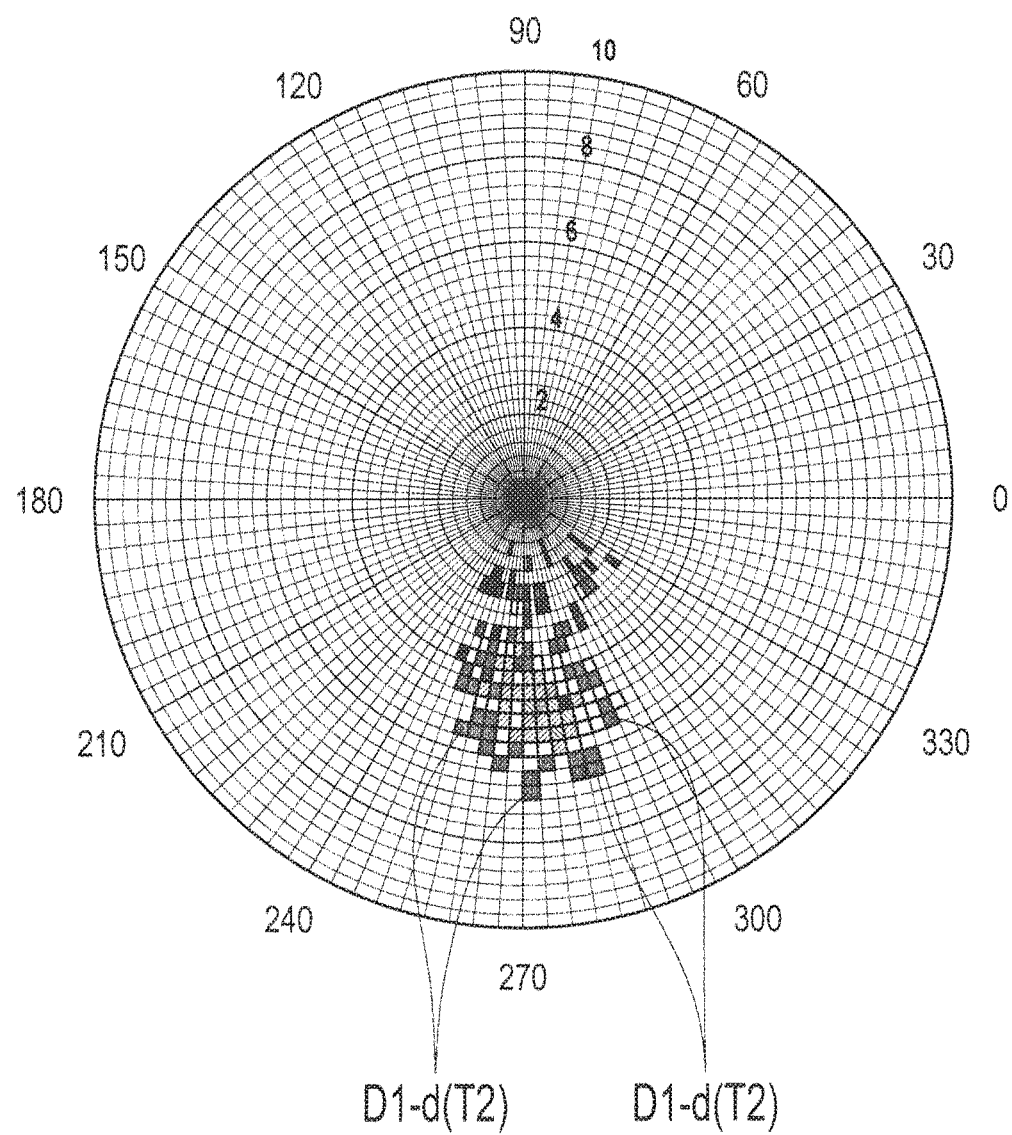
FIG. 11 shows a highlighting of the data range tiles according to FIG. 10, the number of actuator variables of which during flight of the aircraft is below a limit value for this.

In FIG. 11, data range tiles D1-d(T2) that have a number of actuator variables in the flight of the aircraft lying below a limit value for this, are marked with a filling based on the polar coordinate system shown in FIG. 10. In order to exclude measurement errors and statistically insignificant deviations from the flight-specific signature, those data range tiles that have a number of data points lying below the limit value for this, and are thus filled in the present case, are not taken into account.

Figure 12:
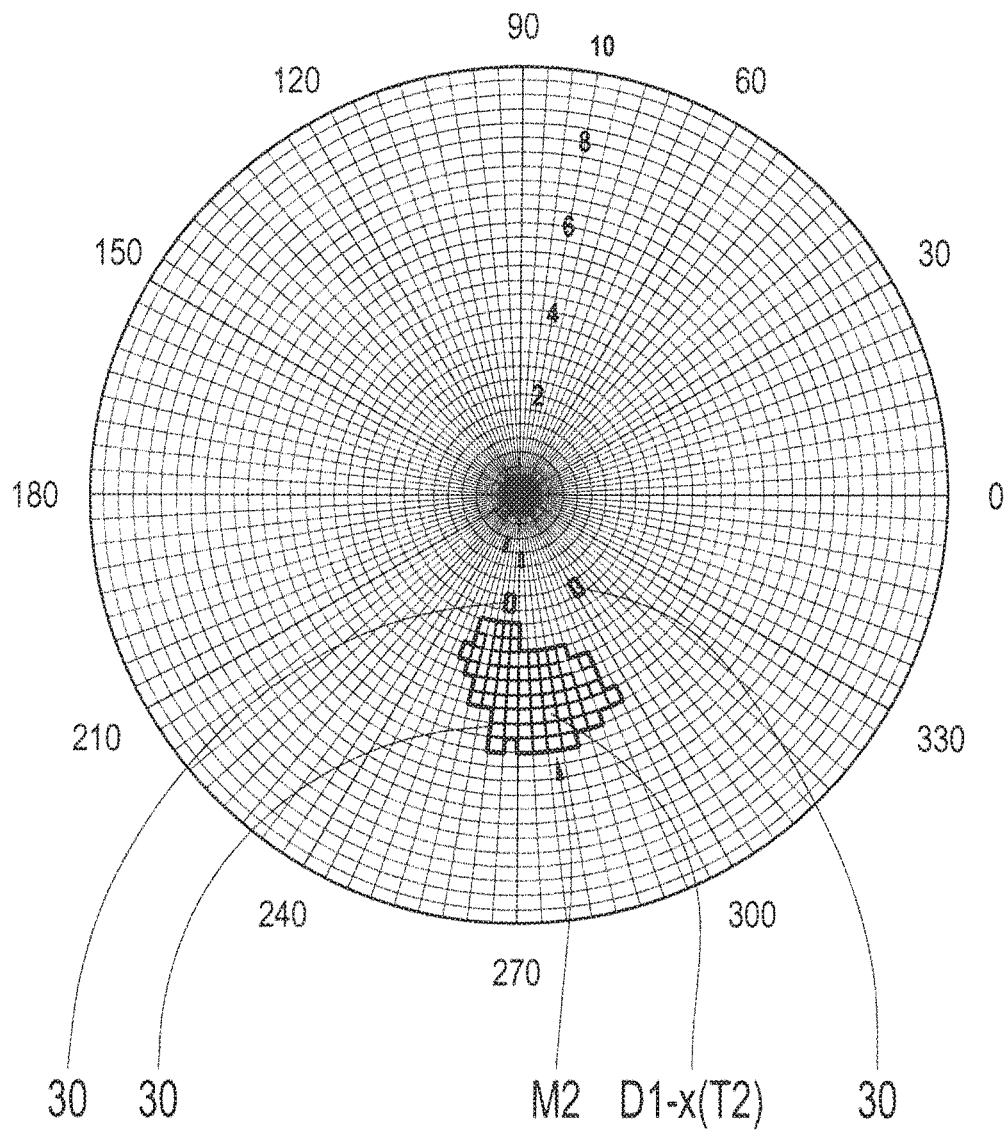
FIG. 12 shows an illustration of data range tiles according to FIG. 11, which lie above the limit value for this, and form a flight-specific signature.

The data range tiles that have a number of second data points V2, or actuator variables, lying below the limit value for this in the flight of the aircraft that are filled in FIG. 11, are no longer shown in FIG. 12, because they have been eliminated. The flight-specific signature M2 is created in this manner. The polar coordinate system shown in FIG. 12 also depicts the flight-specific signature M2 of the aircraft formed from the actuator variables in the flight of the aircraft.

Figure 13:
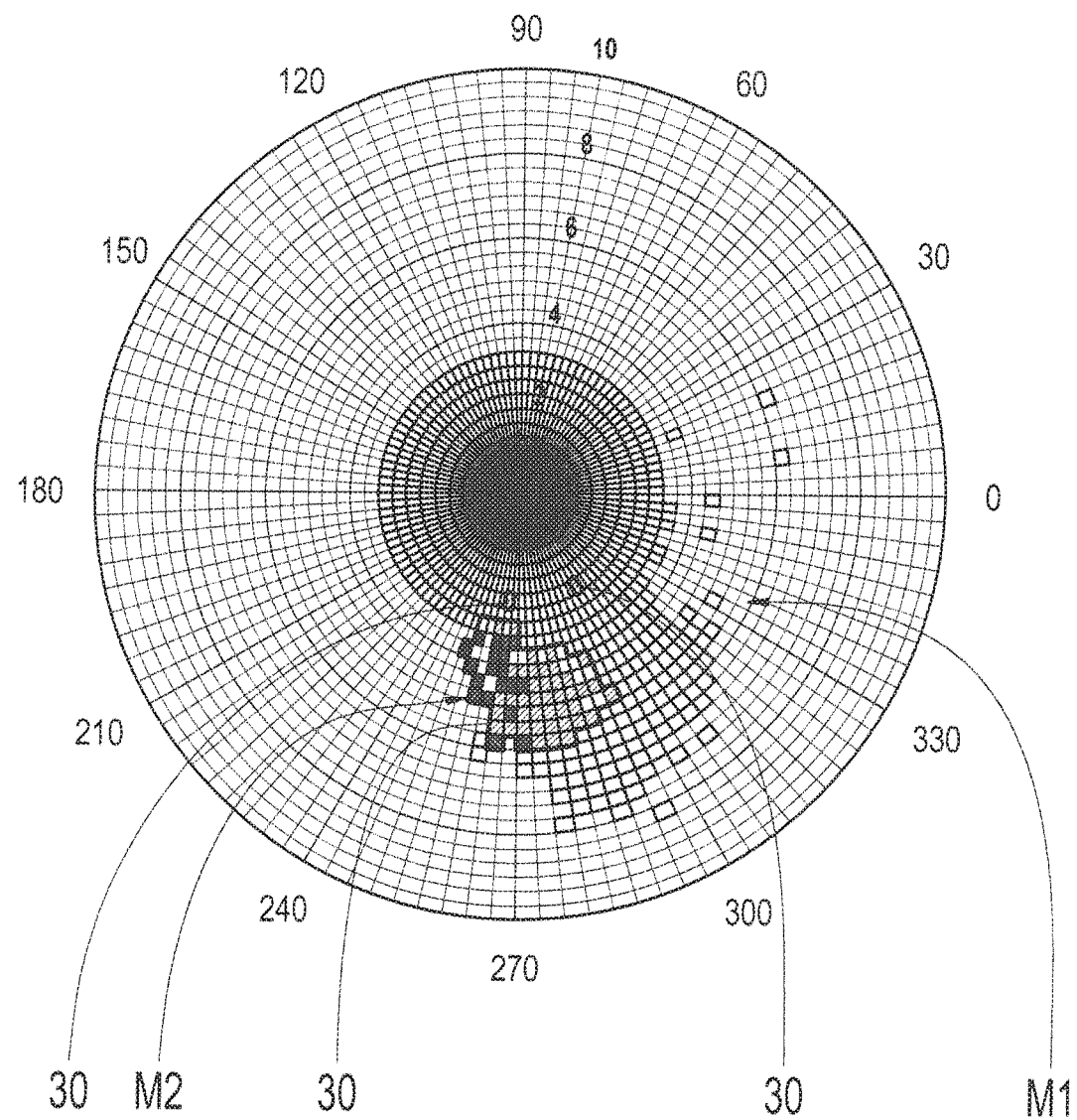
FIG. 13 shows a comparison of the respective data range tiles in the flight-specific signature and the reference flight signature.

The respective data range tiles from the flight-specific signature and the reference flight signature are compared in FIG. 13. In the present case, the flight-specific signature M2 shown in FIG. 12 is supplemented by the reference signature M1 shown in FIG. 8 in order to compare the flight-specific signature M2 with the reference flight signature M1. The comparison of the respective data range tiles from the flight-specific signature M2 and the reference flight signature M1 is used for detecting damage. Each data range tile D1-x(T2) of the flight-specific signature that is not plotted on a data range tile in the reference flight signature M1 indicates a change in the aircraft or the flight spectrum, wherein a low number of deviations of the data range tiles can be regarded as acceptable. The flight-specific signature M2 is highlighted by the outline 30.

If the number of data range tiles deviating between the flight-specific signature M2 and the reference signature M1 exceeds a limit value for this, a warning notification can be issued using a display element, which indicates that there may be damage to the main and/or tail rotor, and a check is suggested.

Furthermore, a difference signature can be generated from a difference between the flight-specific signature M2 and the reference flight signature M1. It is also possible to identify the damage that has occurred based on a comparison of the difference signature with known damage signatures, which have been obtained in tests and/or simulations and stored in a data base.

REFERENCE SYMBOLS 1 reference measurements of vibrations during a first forward flight
2 reference measurements of vibrations during a second forward flight
3 reference measurements of vibrations during a third forward flight
H reference measurements of vibrations when hovering
3' reference measurements of vibrations when the main rotor is damaged
30 outline around a flight-specific signature
D1 first data range or data range tile
D1- . . . (T1) first data range with different numbers of first data points
D1- . . . (T2) first data range with different numbers of second data points
D2 second data range or data range tile
M1 reference pattern or reference flight signature
M2 flight-specific signature
V1 first data points
V2 second data points

The invention claimed is:

1. A method for detecting damages to a rotor of an aircraft, wherein the aircraft comprises actuators for active vibration reduction, the method comprising the following steps:
    determining actuator variables in a reference flight of the aircraft, wherein the actuator variables determined in the reference flight of the aircraft are used for active vibration reduction with the actuators;
    plotting the actuator variables of respective data range tiles determined in the reference flight of the aircraft in first coordinates of a coordinate system, wherein the coordinate system contains numerous closed and non-overlapping data range tiles, wherein the coordinates are also assigned to respective data range tiles, and wherein numerous coordinates can be plotted in a data range tile;

obtaining the number of actuator variables in the reference flight of the aircraft that are located in each data range tile;

eliminating the data range tiles that have a number of actuator variables lying below a limit value for this in the reference flight of the aircraft to create a reference flight signature;

determining actuator variables for a flight-specific signature, wherein the actuator variables determined in the flight of the aircraft are used for vibration reduction with the actuators;

plotting the actuator variables determined in the flight of the aircraft in second coordinates of the coordinate system, wherein the coordinate system contains numerous data range tiles, wherein the second coordinates are also assigned to data range tiles, wherein numerous coordinates can be plotted in a data range tile, and wherein the data range tiles of the flight-specific signature are identical to the data range tiles of the reference flight signature;

obtaining the number of actuator variables in the flight of the aircraft that are located in each data range tile;

eliminating the data range tiles that have a number of actuator variables in the flight of the aircraft that lies below a limit value for this to create the flight-specific signature; and comparing the respective data range tiles from the flight-specific signature and the reference flight signature, wherein, if a limit value for the number of data range tiles deviating between the flight-specific signature and the reference flight signature is exceeded, a warning signal regarding a damage detection is issued.

2. The method according to claim 1, wherein the respective actuator variables are plotted in polar coordinates of a polar coordinate system.

3. The method according to claim 2, wherein additional data range tiles for all angular coordinates from a pole of the polar coordinate system to a limit value radial coordinate are augmented prior to plotting the reference flight signature.

4. The method according to claim 1, wherein at least the comparison of the flight-specific signature with the reference flight signature is carried out during the flight of the aircraft.

5. The method according to claim 1, wherein at least the comparison of the flight-specific signature with the reference signature is carried out after the flight of the aircraft.

6. The method according to claim 1, wherein a minimum number of actuator variables is first obtained in the flight of the aircraft, before the comparison of the flight-specific signature with the reference flight signature.

7. The method according to claim 1, wherein a difference between the flight-specific signature and the reference flight signature is obtained in order to obtain a difference signature, wherein the difference signature is compared with numerous damage signatures stored in a data base in order to identify a specific damage.

8. The method according to claim 7, wherein the damage signatures stored in the data base have been determined in actual tests and/or computer simulations.

9. The method according to claim 1, wherein an adjustable trim flap is used as an actuator for active vibration reduction.

10. The method according to claim 1, wherein an adjustable push rod is used as an actuator for active vibration reduction.

11. The method according to claim 1, wherein the reference flight signature is created from a minimum number of reference flights of the aircraft.

12. The method according to claim 1, wherein the warning signal is issued if a gradient for the number of data range tiles deviating between the flight-specific signature and the reference flight signature exceeds a limit value.

13. The method according to claim 1, wherein the previously determined reference flight signature can be replaced or expanded by data from further reference flights.

* * * * *